(12) United States Patent
Liao et al.

(10) Patent No.: US 7,849,077 B2
(45) Date of Patent: Dec. 7, 2010

(54) DOCUMENT RANKING WITH SUB-QUERY SERIES

(75) Inventors: Ciya Liao, Mountain View, CA (US); Shamim A. Alpha, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 582 days.

(21) Appl. No.: 11/481,686

(22) Filed: Jul. 6, 2006

(65) Prior Publication Data

US 2008/0010268 A1  Jan. 10, 2008

(51) Int. Cl.
*G06F 17/30* (2006.01)

(52) U.S. Cl. .................. 707/718; 707/713; 707/765

(58) Field of Classification Search .................. 707/1–3, 707/4, 5, 7, 10, 705, 706, 707, 765, 766, 707/767, 768

See application file for complete search history.

(56) References Cited

U.S. PATENT DOCUMENTS

| | | | |
|---|---|---|---|
| 5,696,962 A | 12/1997 | Kupiec | |
| 5,724,571 A | 3/1998 | Woods | |
| 5,956,707 A | 9/1999 | Chu | |
| 6,611,835 B1 * | 8/2003 | Huang et al. | 707/10 |
| 7,139,757 B1 * | 11/2006 | Apollonsky et al. | 707/7 |
| 7,305,390 B2 * | 12/2007 | Bowman et al. | 707/5 |
| 2004/0225643 A1 | 11/2004 | Alpha et al. | |
| 2006/0167842 A1 * | 7/2006 | Watson | 707/3 |
| 2006/0253410 A1 * | 11/2006 | Nayak et al. | 707/1 |
| 2007/0016545 A1 * | 1/2007 | Broder et al. | 707/1 |
| 2007/0250498 A1 * | 10/2007 | Pedersen et al. | 707/5 |

OTHER PUBLICATIONS

Terry Gaasterland, Cooperative Answering through Controlled Query Relaxation, IEEE Expert, Sep./Oct. 1997, pp. 48-59, Argonne Natl Lab. and the Univ. of Chicago, Chicago, IL.

* cited by examiner

*Primary Examiner*—Mohammad Ali
*Assistant Examiner*—Thuy (Tiffany) Bui
(74) *Attorney, Agent, or Firm*—Kraguljac & Kalnay, LLC

(57) ABSTRACT

Systems, methods, media, and other embodiments associated with ranking documents by providing a search engine with a series of sub-queries generated from an original query are described. One example system includes input logic for receiving a query. The example system may include a relaxation logic configured to produce sub-queries from the query. The sub-queries may describe metadata string matching, content string matching, and/or metadata numerical attribute analysis. The sub-queries may be provided by an output logic to a search engine in an order that facilitates defining document relevance without requiring post-retrieval relevance ranking.

22 Claims, 5 Drawing Sheets

DOCUMENT RANKING WITH SUB-QUERY SERIES

BACKGROUND

Document retrieval typically includes a post-retrieval relevance ranking step. Traditional document retrieval may include retrieving a large set of documents, ranking the entire set of documents, and then presenting a limited number of documents based on relevancy rank. The ranking may depend, for example, on matches between search terms and document content, on numerical analysis of values like link scores, on term frequency, term position, term distance, and so on. This traditional type of document retrieval may sacrifice response time to improve both recall and precision.

Document retrieval typically also includes some form of search term relaxation to improve recall, sometimes at the expense of precision. Traditional relaxation includes stemming search terms, performing value relaxation (e.g., expanding a numeric range), performing structure relaxation, and so on. Traditional relaxation methods may also include rewriting a predicate into a more general predicate, rewriting a constant term into a more general constant, breaking a join dependency across literals in a query, and so on. However, this traditional type of relaxation may further sacrifice response time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
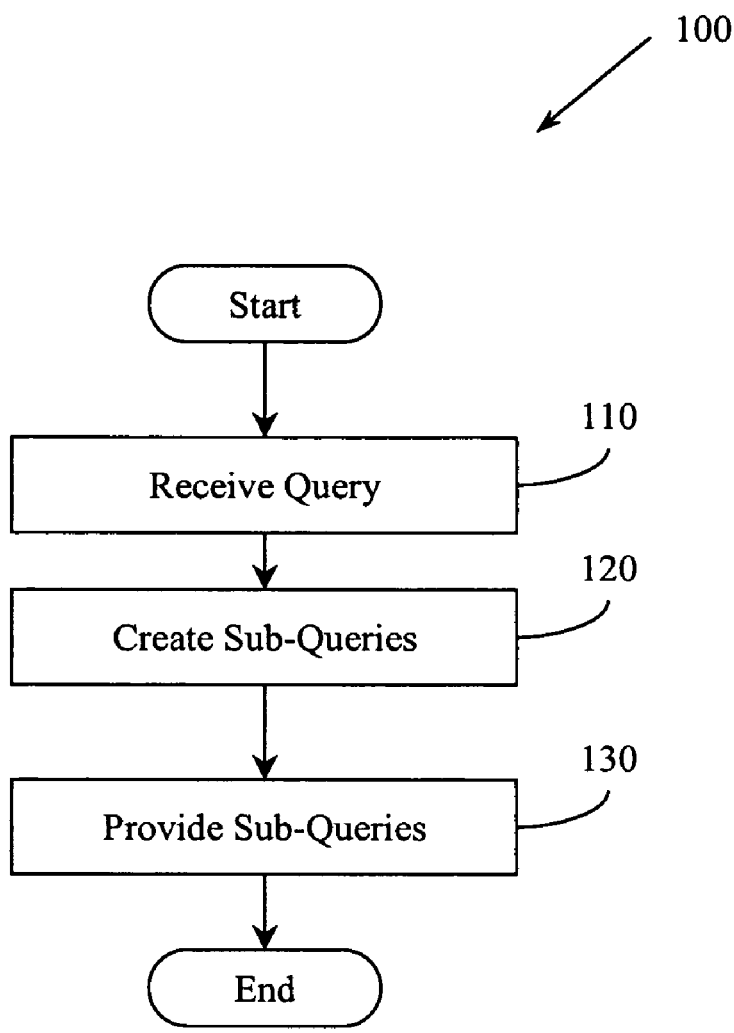
FIG. 1 illustrates an example method configured to facilitate document ranking by providing a search engine with a series of sub-queries.

Example systems and methods concern document ranking using an ordered series of sub-queries rather than via a post-retrieval ranking operation. One example system includes logic for receiving a query. The query may be configured as an input for a search engine that will retrieve documents in response to receiving a query. The example system may include a relaxation logic that is configured to produce sub-queries from the query. Rather than performing traditional relaxation, the relaxation logic may produce sub-queries that describe metadata string matching, content string matching, and/or metadata numerical attribute analysis. The relaxation logic may also order sub-queries based on the relevance of documents the sub-queries would yield. For example, a sub-query that does phrase-level matching on metadata (e.g., title) may be ordered ahead of a sub-query that does Boolean AND level matching on document content.

The example system may also include an output logic that is configured to present sub-queries to a search engine in an order that facilitates defining document relevance without requiring post-retrieval relevance ranking. The example system may therefore retrieve a much smaller number of documents than a traditional document retrieval system, making the example system more useful in a real-time search environment. Also, since there is no post-retrieval ranking operation, the example system consumes fewer processing cycles than traditional systems. Additionally, since sub-queries are provided to a search engine rather than traditional omnibus queries, fewer documents may be retrieved. This may reduce both bandwidth requirements between the system and the search engine and processing power requirements for the search engine.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk) and volatile media (e.g., semiconductor memory, dynamic memory). Common forms of computer-readable mediums include floppy disks, hard disks, magnetic tapes, CD-ROMs, RAMs, ROMs, and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software stored on a computer-readable medium or in execution on a computer and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

"Query", as used herein, refers to a semantic construction that facilitates gathering and processing information. A query may be formulated in a natural language, in a database query language like structured query language (SQL), an object query language (OQL), and so on. A query may be implemented in computer code (e.g., C#, C++, Javascript) for gathering information from various data stores and/or information sources. In one example, a query may be a single term while in other examples a query may include multiple terms. A query may include terms upon which a document is to be searched and terms that relate the search terms (e.g., AND, OR).

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions stored on a computer-readable medium that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Software suitable for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

"Phrase matching", as used herein, refers to exactly matching two strings of equal length. An example phrase match is "two dogs" matching the first two words in the string "two dogs walked down the street".

"Proximity matching", as used herein, refers to matching a search phrase to a set of terms found within a desired distance of each other in a document. An example proximity match (e.g., two/3 dogs) would be satisfied by the text "two big red dogs walked down the street" since the two words appear within three words of each other. However, the example proximity match would not be satisfied by the text "two very large and hungry German Shepherd dogs loped behind the fence".

"Boolean AND matching" or "AND matching", as used herein, refers to matching a search phrase to a set of terms found anywhere in a document. For example, the search "two AND dogs" would be satisfied by the text "two very large and hungry German Shepherd dogs loped behind the fence" while the search would not be satisfied by the text "two very large and hungry German Shepherds loped behind the razor wire fence".

Clearly, if a document satisfies a phrase match it will also satisfy a proximity match and a Boolean AND match. Similarly, if a document satisfies a proximity match it will also satisfy a Boolean AND match. A document that satisfies a phrase match may be deemed more relevant than a document that satisfies a proximity match and a document that satisfies a proximity match may be deemed more relevant than a document that satisfies a Boolean AND match. Thus, rather than retrieving all documents that satisfy all three matches, sub-queries may be produced that will first retrieve documents that satisfy a phrase match, then retrieve documents that satisfy a proximity match, and lastly retrieve documents that satisfy a Boolean AND match. Duplicates provided by subsequent matches may need to be discarded before presentation to a user. If a desired number of documents are retrieved in response to an earlier sub-query, a subsequent sub-query may not have to be provided to a search engine.

"Stemming", as used herein, refers to producing a similar or related term from a query term. For example, a query may include the term "run". Stemming this term may yield the set of terms {run, runs}, the set of terms {run, runs, ran}, the set of terms {run, runs, running} and so on. Stemming usually increases query recall while reducing precision. Standard information retrieval terminology defines recall as the ratio of retrieved relevant documents to the number of relevant documents in the space searched by a search engine. Standard information retrieval terminology also defines precision as the ratio of the number of relevant documents retrieved to the total number of documents retrieved.

FIG. 1 illustrates a computer implemented method 100 that is configured to facilitate document ranking using a series of sub-queries. Method 100 may include, at 110, receiving a query. The query may be configured as an input to a search logic (e.g., search engine). The input may cause a search logic to retrieve documents. The documents may include, for example, text elements (e.g., document content) and metadata elements (e.g., data describing the document). The query may include, for example, a single term, a phrase, a set of terms, and so on.

Method 100 may also include, at 120, creating from the query a series of sub-queries $\{SQ_1, \ldots SQ_N\}$, N being an integer greater than 1. The series of sub-queries may include different types of sub-queries. For example, the series may include a metadata-centric sub-query and a linguistic-centric sub-query. A metadata-centric sub-query may be configured to match a query term or phrase to a metadata element(s) on a phrase level. Additionally, a metadata-centric sub-query may be configured to match a query term or phrase to a metadata element(s) on a proximity level and/or on a Boolean AND level. Similarly, a linguistic-centric sub-query may be configured to match a query term or phrase to a document text element(s) on a phrase level, on a proximity level, and/or on a Boolean AND level. Additionally, the series of sub-queries may include a sub-query that focuses on a numeric metadata link score and/or a numeric metadata URL (Uniform Resource Locator) depth. The metadata link score will be directly proportional to document relevance while the numeric URL depth will be inversely proportional to document relevance.

Link score refers to the number of documents that reference a document. When document A references document B it can be considered a "vote" by document A that document B is important. If document B has a higher link score than document C, where both document B and document C match search terms, then document B may be more relevant than document C. URL depth concerns the number of slash "/" characters that appear in the path component in a URL. The more slashes, the farther down a hierarchy one has to travel to find the document. Documents closer to the top of a hierarchy may be more relevant than those buried at the bottom of a hierarchy.

A document that satisfies a metadata-centric sub-query on a phrase level match may be considered more relevant than a document that satisfies a linguistic-centric sub-query on a Boolean AND level. Thus, these queries may be ordered to facilitate retrieving the more relevant documents first. In one example, the series of sub-queries may be configured (e.g., ordered) so that a sub-query $SQ_X$ will cause the search logic to retrieve fewer documents than a sub-query $SQ_Y$ when X<Y. Additionally, the series of sub-queries may be configured so that a sub-query $SQ_A$ will cause the search logic to retrieve documents having a higher relevancy than a sub-query $SQ_B$ when A<B. This means that sub-queries presented to a search logic at an earlier point in time will retrieve fewer documents than sub-queries presented at a later point in time. This also means that sub-queries presented to a search logic at an earlier point in time will retrieve documents that are more relevant than sub-queries presented at a later point in time. Ordering sub-queries in this manner facilitates retrieving just enough documents to satisfy a recall requirement. Ordering sub-queries in this manner also facilitates retrieving documents in an order that facilitates satisfying a precision requirement. Reducing the number of documents retrieved may also improve response time, thereby enhancing a user experience.

Method 100 may also include, at 130, providing sub-queries to the search logic in an order that will retrieve more relevant documents first. In one example, sub-queries may be provided until a pre-determined number of documents are retrieved by the search logic. The pre-determined number may be a fixed number (e.g., ten documents), a user-configurable number of documents, and so on. In different examples the sub-queries may include the exact term(s) provided in the received query and/or may include stemmed versions of the term(s).

The sub-queries may be provided to the search engine in an order that facilitates retrieving documents in order based on relevance. For example, the series of sub-queries may be ordered to recognize that matches between a query term(s) and metadata elements are more determinative of document relevancy than matches between a query term(s) and text elements. The series may be further ordered to recognize that a phrase match is more determinative of document relevancy than a proximity match and to recognize that a proximity match is more determinative of document relevancy than a Boolean AND match.

In one example, metadata elements may include a title, a description, a keyword, a subject, an author, a URL, an H1 headline, an H2 headline, and an anchor text. A title may be found, for example, in a <title> field of an HTML (hypertext markup language) page. A description may be found, for example, in a <description> field of an HTML page. A keyword may be found, for example, in a <keyword> field of an HTML page. A subject may be found, for example, in a <subject> field of an HTML page. An author may be found, for example, in a <author> field of an HTML page. A URL may be retrieved, for example, from a URL path, from a filename, from an index portion of a host name, and so on. An H1 headline may be found, for example, by locating the largest font heading within the body of an HTML page. An H2 headline may be found, for example, by locating the second largest font heading within the body of an HTML page. Anchor text may be found, for example, in the text of a referencing page. While HTML pages are described, it is to be appreciated that metadata may be retrieved from locations (e.g., fields) in other types of documents (e.g., XML). Also, while HTML pages are described, it is to be appreciated that documents other than HTML web pages may be processed.

In one example, metadata elements may have related metadata element weights. This facilitates controlling which metadata elements are treated as being more important to document relevance. For example, in certain problem spaces a title may be very relevant (e.g., bio-chemical research papers) while in other problem spaces a title may be practically meaningless. Having user-configurable weights facilitates customizing method 100 for various problem spaces. Therefore, document relevance may be a function of a type of match between a query phrase and a metadata element (e.g., phrase, proximity, AND) and may also be a function of the metadata element weight. For example, let $w_i$ denote the weight for an i-th metadata type. In one example a document relevancy score may be a summation of metadata weights for metadata items matched by the document divided by overall metadata weights (e.g., Relevance_Score=SUM $w_i$m(i,d)/SUM wi), where m(i,d) is a binary function (0,1) that reports on whether the i-th metadata from document d matches query terms.

In one example, metadata element and metadata element weight pairs may include (title, $w_1$), (description, $w_2$), (keyword, $w_3$), (subject, $w_4$), (author, $w_5$), (url, $w_6$), (H1 headline, $w_7$), (H2 headline, $w_8$), and (anchor text, $w_9$). In the example, $w_1$ through $w_9$ are configurable to facilitate controlling document relevance without performing document retrieval. In one example, $w_1>w_2>w_3>w_4>w_5>w_6>w_7>w_8>w_9$.

While FIG. 1 illustrates various actions occurring in serial, it is to be appreciated that various actions illustrated in FIG. 1 could occur substantially in parallel. By way of illustration, a first process could receive queries, a second process could create sub-queries, and a third process could provide sub-queries to a search engine. While three processes are described, it is to be appreciated that a greater and/or lesser number of processes could be employed and that lightweight processes, regular processes, threads, and other approaches could be employed.

In one example, methods are implemented as processor executable instructions and/or operations stored on a computer-readable medium. Thus, in one example, a computer-readable medium may store processor executable instructions operable to perform a method that includes receiving a query configured to cause a search logic to retrieve documents. The documents may include text elements and metadata elements. The method may also include creating from the query a series of sub-queries. The series of sub-queries may include a metadata-centric sub-query and a linguistic-centric sub-query. The series of sub-queries may be configured so that an earlier sub-query will cause the search logic to retrieve fewer documents than a later sub-query. The series of sub-queries may also be configured so that an earlier sub-query will cause the search logic to retrieve documents having a higher relevancy than a later sub-query. The method may also include providing sub-queries to the search logic in order until a pre-determined number of documents are retrieved by the search logic. While this method is described being stored on a computer-readable medium, it is to be appreciated that other example methods described herein may also be stored on a computer-readable medium.

Figure 2:
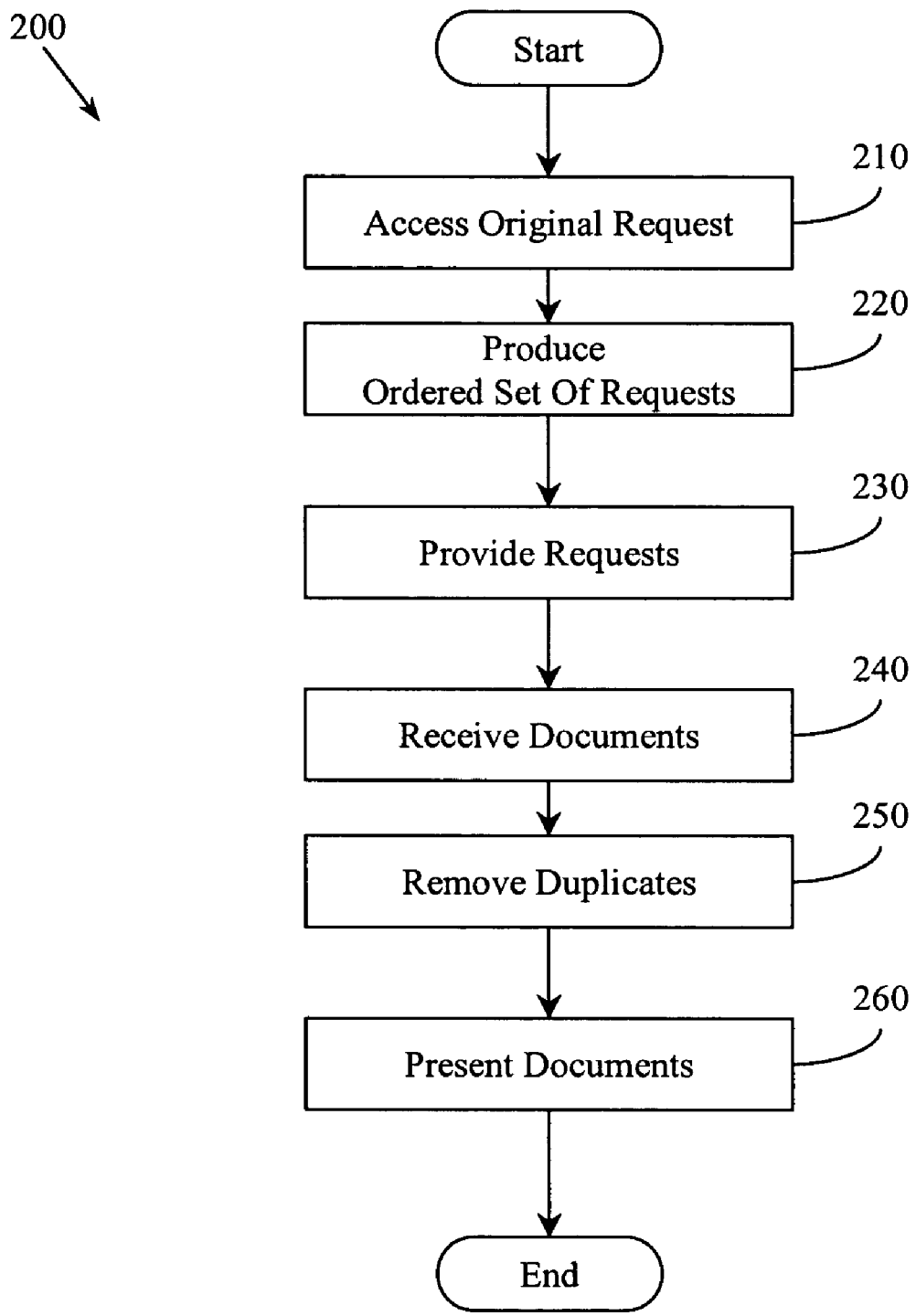
FIG. 2 illustrates an example method configured to facilitate document ranking by providing a search engine with an ordered set of requests.

FIG. 2 illustrates a computer-implemented method 200 that is configured to facilitate document ranking by providing a search engine with an ordered set of requests. Method 200 may include, at 210, accessing an original request for documents. Accessing the original request may include, for example, retrieving the request from a record, retrieving the request from a table, receiving the request, and so on. The request may include a search term, a search phrase, a set of search terms, a set of search phrases, and so on.

Method 200 may also include, at 220, producing an ordered set of requests to present to a search engine. The ordered set of requests will be produced from the original request. Typically a large, complicated, omnibus query would be produced from the original request. Here, method 200 will not produce the traditional omnibus request. Instead, a set of smaller requests will be produced. When the ordered set of requests are presented to a search engine it will return documents in an order determined, at least in part, by document relevance. In this way, a user may contribute to determining relevancy rather than relying solely on a search engine to determine relevancy.

A member of the ordered set of requests may include, for example, a metadata analysis based component, a linguistic analysis based component, and a link analysis based component. These three components may be configured to work together to facilitate determining document relevance before a search engine returns any documents. The relevance may be determined by the type of match made to either metadata or document content. The relevance may also be determined by numeric data like a link score or URL depth. Producing requests that combine different components (e.g., metadata analysis based, linguistic analysis based, link analysis based) weighted in different manners facilitates controlling a search logic to return documents in order based on user described relevance. This removes the need to perform a post-retrieval relevance ranking operation.

In one example, the metadata analysis based component of a request may associate a relevance $r_1$ with a phrase match, a relevance $r_2$ with a proximity match, and a relevance $r_3$ with a Boolean AND match, where $r_1>r_2>r_3$. When determining relevance, phrase matches will therefore be more important than proximity matches and proximity matches will be more important than Boolean AND matches. Requests focused on phrase matches may be presented to the search logic before requests focused on proximity matches and Boolean matches.

Additionally and/or alternatively, the metadata analysis based component may associate a significance $s_1$ with a match with title metadata, a significance $s_2$ with a match with description metadata, a significance $s_3$ with a match with keyword metadata, a significance $s_4$ with a match with subject metadata, a significance $s_5$ with a match with author metadata, a significance $s_6$ with a match with URL metadata, a significance $s_7$ with a match with H1 headline data, a significance $s_8$ with a match with H2 headline data, and a significance $s_9$ with an anchor text metadata. In one case $s_1$ through $s_9$ may be configurable to facilitate determining document relevance before the search engine returns documents. In one example, $s_1>s_2>s_3>s_4>s_5>s_6>s_7>s_8>s_9$. When determining relevance in the example, title matches will therefore be considered to be more important than description matches and so on. Thus, requests focused on title matches may be presented to the search logic before requests focused on description matches and so on.

Having $r_1$ through $r_3$ and $s_1$ through $s_9$ available and/or configurable facilitates combining metadata match type and metadata significance in a user definable function that determines relevance. For example, by manipulating the values of $r_1$ through $r_3$ and $s_1$ through $s_9$, the relative importance of a phrase match on headline metadata may be established with respect to the relative importance of a proximity match to author metadata.

Additionally, and/or alternatively, the linguistic analysis based component may associate a relevance $r_4$ with a phrase match, a relevance $r_5$ with a proximity match, and a relevance $r_6$ with a Boolean AND match, where $r_4>r_5>r_6$. In one example, $r_1>r_4$. Having $r_1$ through $r_6$ and $s_1$ through $s_9$ available and/or configurable facilitates combining linguistic match type, metadata match type, and metadata significance in a function that determines relevance.

Additionally, and/or alternatively the link analysis based component may associate a relevance $r_7$ with a link score and a relevance $r_8$ with a URL depth. The link score will be directly proportional to document relevance while the URL depth will be inversely proportional to document relevance. Thus, $r_7$ and $r_8$ may be used to facilitate determining document relevance before the search engine returns documents. Therefore, link analysis relevance, linguistic match type, metadata match type, and metadata significance may all be combined together in a function that determines relevance.

Method 200 may also include, at 230, providing members of the ordered set of requests to the search engine. These members may be provided, for example, until a desired number of documents are returned. The type of requests provided and the order in which they are provided may depend, at least in part, on the number of terms in the original request. For example, when the original request has two or more terms, the ordered sets of requests may include the following requests in the following order:

(1) a request including (a) phrase level matching between document metadata and the terms, and (b) link score analysis, and/or URL depth analysis, (the terms may be stemmed)

(2) a request including (a) proximity level matching between document metadata and the terms, and (b) link score analysis and/or URL depth analysis (3) a request including (a) phrase level matching between document content and the terms, and (b) link score analysis and/or URL depth analysis (the terms may be stemmed)

(4) a request including (a) proximity level matching between document content and terms, and (b) link score analysis and/or URL depth analysis (5) a request including proximity level matching between document content and the terms (6) a request including AND level matching between document content and the terms.

Similarly, when the original request has only a single term, the ordered sets of requests may include the following requests in the following order:

(1) a request including (a) matching between document metadata and the term, and (b) link score analysis and/or URL depth analysis with (b) being the dominant condition (2) a request including (a) matching between document metadata and the term, and (b) link score analysis and/or URL depth analysis (term may be stemmed)

(3) a request including (a) matching between document content and term, and (b) link score analysis and/or URL depth analysis (4) a request including matching between document content and the term (term may be stemmed).

Method 200 may also include, at 240, receiving documents from the search engine. A first set of documents may be received in response to a first request being sent to the search engine, a second set of documents may be received in response to a second request being sent to the search engine, and so on. Since the first request would have been configured to lead to more relevant documents being retrieved, the first set of documents would likely have higher relevancy than the second set of documents.

Different requests sent to the search engine may result in the same document being retrieved. Therefore, method 200 may also include, at 250, removing duplicate returned documents. With duplicates removed, method 200 may continue, at 260, to present (e.g., display) documents to a user.

Figure 3:
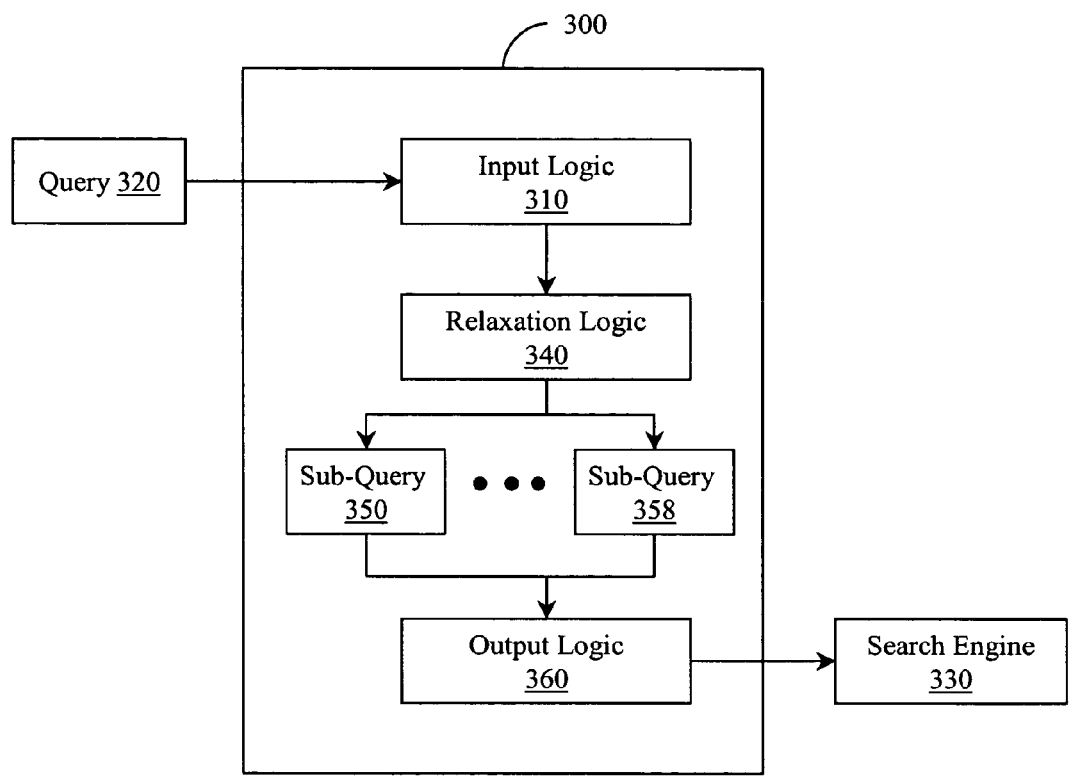
FIG. 3 illustrates an example system configured to facilitate requesting documents in order based on relevance.

FIG. 3 illustrates a system 300 that is configured to facilitate requesting documents in order based on relevance. Rather than causing documents to be retrieved and then relevance ranking the documents, system 300 prepares requests that will return a limited number of documents as compared to a conventional system. Documents returned in response to an earlier request will include more relevant documents than documents returned in response to a later request.

System 300 may include an input logic 310 that is configured to receive a query 320. The query 320 may be received, for example, from a user. A user may enter a query that includes a single term, a single phrase, multiple terms, multiple phrases, and so on. The query 320 may be configured as an input for a search engine 330. Search engine 330 may be configured to retrieve documents. The documents searched may include both text and metadata. The metadata available to match in a document may include, for example, a title, a description, a keyword, a subject, an author, a URL, a headline, and an anchor text. Additionally, metadata available to be analyzed numerically may include a link score for a document, and a URL depth for a document.

System 300 may also include a relaxation logic 340 that is configured to produce sub-queries (e.g., sub-query 350 through sub-query 358) from the query 320. The sub-queries may be configured to describe metadata string matching, content string matching, and/or metadata numerical attribute analysis. Thus, the sub-queries may be configured to define document relevance, thereby making traditional post-retrieval relevance ranking unnecessary.

In one example, the relaxation logic 340 may be configured to produce sub-queries that include phrase matching sub-queries, proximity matching sub-queries, and Boolean matching sub-queries. These sub-queries may be produced and stored in an order that will facilitate controlling the order in which documents are retrieved. For example, sub-queries focused on phrase matching may be provided to search engine 330 before sub-queries focused on AND matching.

System 300 may also include an output logic 360 that is configured to provide sub-queries to the search engine 330 in an order that facilitates receiving relevant documents in order. In one example, the output logic 360 may be configured to provide sub-queries to the search engine 330 until a desired number of documents have been retrieved.

Figure 4:
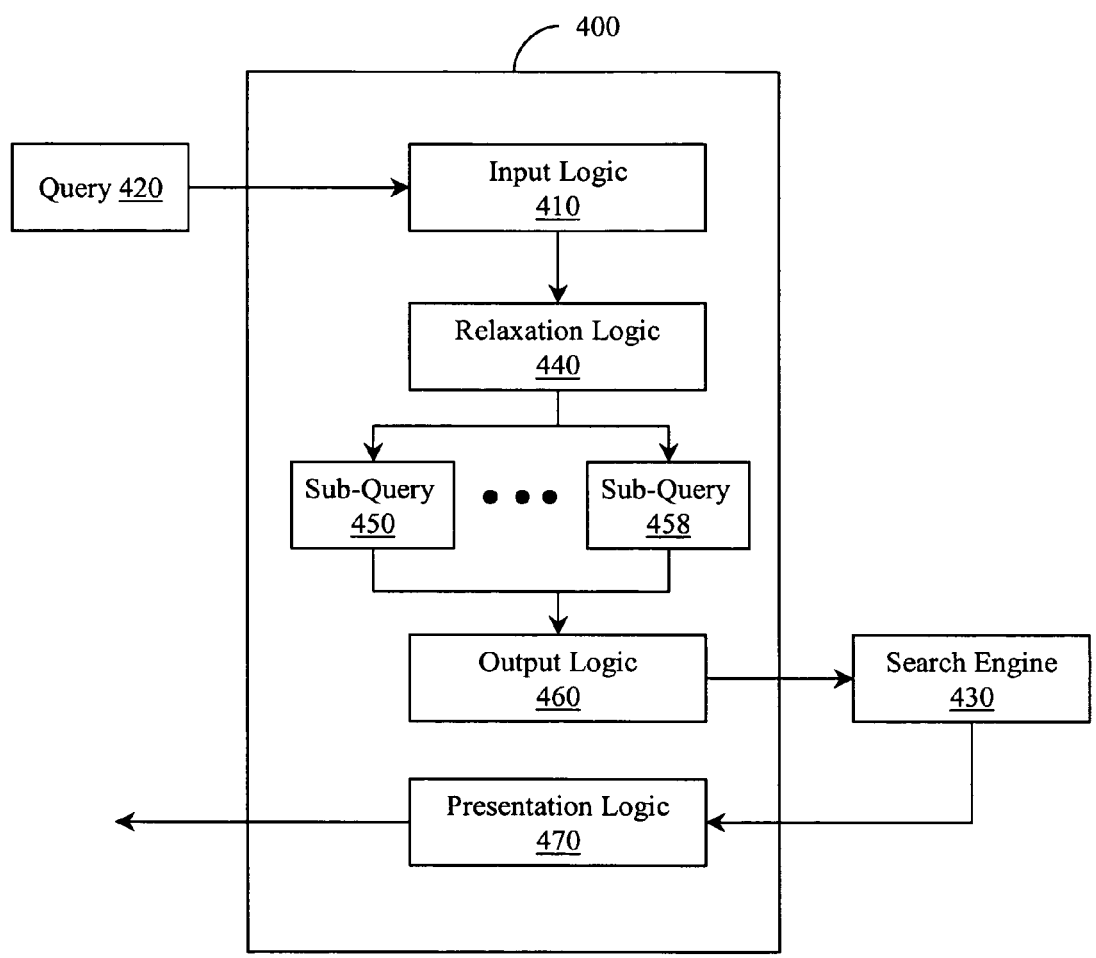
FIG. 4 illustrates an example system configured to facilitate requesting and displaying documents in order based on relevance without performing post-retrieval relevance ranking.

FIG. 4 illustrates a system 400 that is configured to facilitate requesting and displaying documents in order based on relevance without performing post-retrieval relevance ranking. System 400 includes several elements similar to those described in connection with system 300 (FIG. 3). For example, system 400 includes an input logic 410, relaxation logic 440, and output logic 460. These logics process a query 420 into sub-queries (e.g., sub-query 450 through sub-query 458) and provide the sub-queries to search engine 430. Additionally, system 400 includes a presentation logic 470.

Presentation logic 470 may be configured to provide retrieved documents to a user. The documents may be ordered based on relevance without performing post-retrieval relevance ranking due to the order in which sub-queries were provided to the search engine 430. In one example, the presentation logic 470 may be configured to selectively remove duplicate retrieved documents.

Figure 5:
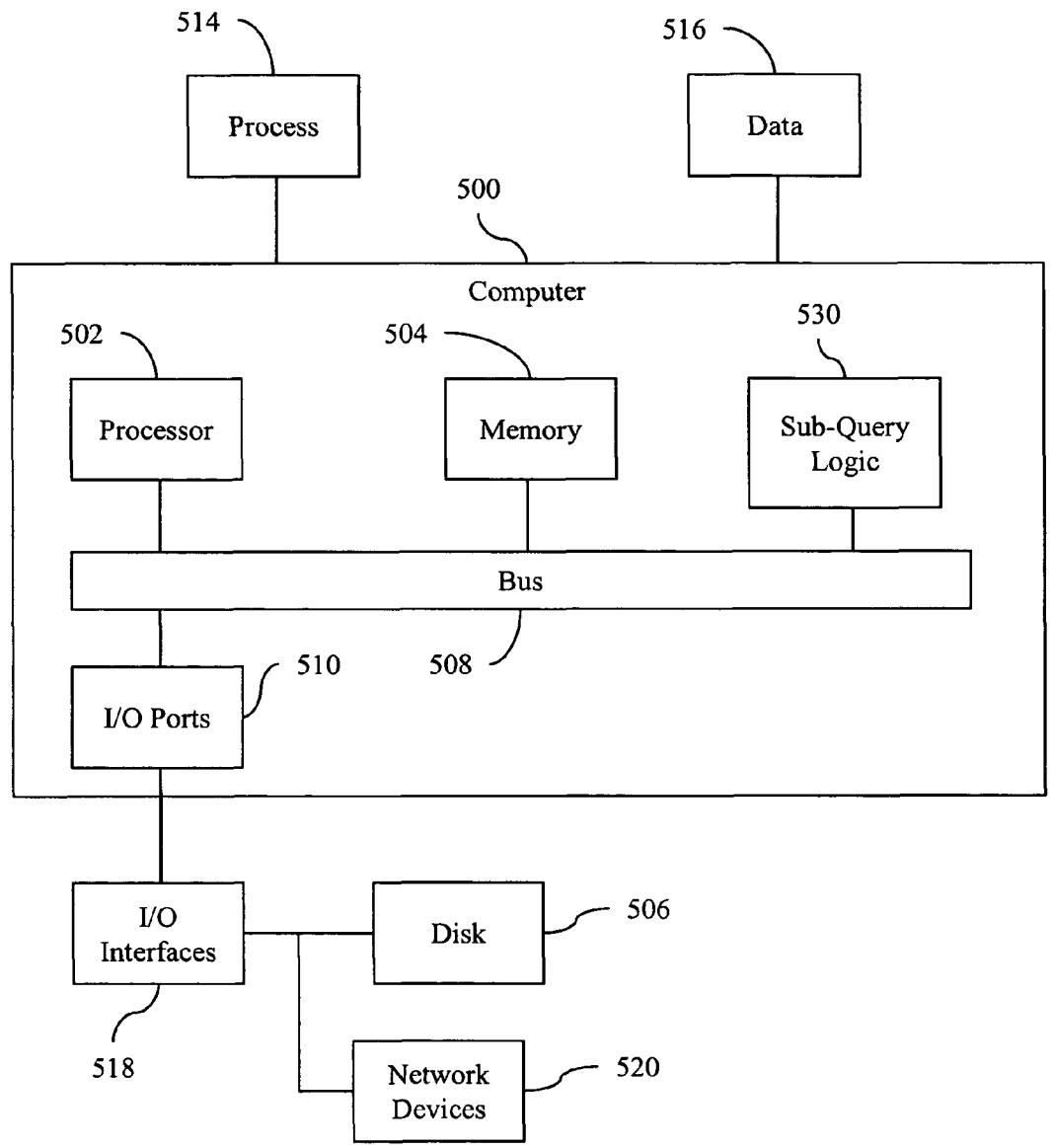
FIG. 5 illustrates an example computing environment in which example systems and methods described herein can operate.

FIG. 5 illustrates a computing device 500 in which example systems and methods described herein, and equivalents, may operate. The example computing device may be a computer 500 that includes a processor 502, a memory 504, and input/output ports 510 operably connected by a bus 508. In one example, computer 500 may include a sub-query logic 530. Sub-query logic 530 may provide means (e.g., hardware, software, firmware) for receiving a query intended for a search engine. Sub-query logic 530 may also provide means (e.g., hardware, software, firmware) for manipulating the query into relaxed sub-queries. The relaxed sub-queries may be configured to perform metadata matching, content matching, and metadata numerical analysis. The metadata matching and content matching may be at a phrase level, a proximity level, and a Boolean level. Performing the various matching and analyses at different levels facilitates controlling the relevance of documents retrieved by a search engine. Sub-query logic 530 may also provide means for providing relaxed subqueries to a search engine in an order that in effect pre-selects documents based on relevance. In different examples, logic 530 may be implemented in hardware, software, firmware, and/or combinations thereof. While logic 530 is illustrated as a hardware component attached to bus 508, it is to be appreciated that in one example logic 530 could be implemented in processor 502.

Generally describing an example configuration of computer 500, processor 502 may be a variety of various processors including dual microprocessor and other multi-processor architectures. Memory 504 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 506 may be operably connected to the computer 500 via, for example, an input/output interface (e.g., card, device) 518 and an input/output port 510. Disk 506 may be, for example, a magnetic disk drive, a solid state disk drive, a floppy disk drive, a tape drive, a Zip drive, a flash memory card, and/or a memory stick. Furthermore, disk 506 may be a CD-ROM, a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 may be a single internal bus interconnect architecture and/or other bus or mesh architectures. While a single bus is illustrated, it is to be appreciated that computer 500 may communicate with various devices, logics, and peripherals using other busses (e.g., PCIE, SATA, Infiniband, 1394, USB, Ethernet). Bus 508 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with input/output devices via i/o interfaces 518 and input/output ports 510. Input/output devices may be, for example, a keyboard, a microphone, a pointing and selection device, cameras, video cards, displays, disk 506, network devices 520, and so on. Input/output ports 510 may include, for example, serial ports, parallel ports, and USB ports.

Computer 500 can operate in a network environment and thus may be connected to network devices 520 via i/o interfaces 518, and/or i/o ports 510. Through the network devices 520, computer 500 may interact with a network. Through the network, computer 500 may be logically connected to remote computers. Networks with which computer 500 may interact include, but are not limited to, a local area network (LAN), a wide area network (WAN), and other networks. In different examples, network devices 520 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 520 may connect to WAN technologies including, for example, point to point links, circuit switching networks (e.g., integrated services digital networks (ISDN)), packet switching networks, and digital subscriber lines (DSL).

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer implemented method, comprising:
receiving a query, the query being configured to cause a search logic to retrieve one or more documents, the documents comprising text elements and metadata elements;
creating from the query a series of sub-queries $\{SQ_1, \ldots SQ_N\}$, N being an integer greater than 1, the series of sub-queries including a sub-query based on one or more of a numeric metadata link score and a numeric metadata URL depth;
the series of sub-queries being configured so that a sub-query $SQ_X$ will cause the search logic to retrieve fewer documents than a sub-query $SQ_Y$ when X<Y;
the series of sub-queries being configured so that a sub-query $SQ_A$ will cause the search logic to retrieve documents having a higher relevancy than a sub-query $SQ_B$ when A<B; and
providing, in order according to the configuration of the series of sub-queries, one or more sub-queries from the series of sub-queries to the search logic until a predetermined number of documents are retrieved by the search logic.

2. The method of claim 1, where the series of sub-queries includes a metadata-centric sub-query and further where the metadata-centric sub-query comprises one or more of, a sub-query that matches terms in the query to one or more metadata elements on a phrase level, a sub-query that matches terms in the query to one or more metadata elements on a proximity level, and a sub-query that matches terms in the query to one or more metadata elements on a Boolean AND level.

3. The method of claim 2, where the metadata elements include one or more of, a title, a description, a keyword, a subject, an author, a uniform resource locator (URL), an H1 headline, an H2 headline, and an anchor text.

4. The method of claim 2, where the metadata-centric sub-query includes at least one metadata element associated with a metadata element weight, and where the document relevance is a function of:
a type of match between terms in the query and the metadata element.

5. The method of claim 1, where the series of sub-queries includes a linguistic-centric sub-query and further where the linguistic-centric sub-query includes one or more of, a sub-query that matches terms in the query to one or more text elements on a phrase level, a sub-query that matches terms in the query to one or more text elements on a proximity level, and a sub-query that matches terms in the query to one or more text elements on a Boolean AND level.

6. The method of claim 1, including creating a sub-query by stemming terms in the query.

7. The method of claim 1, where the series of sub-queries includes a metadata-centric sub-query and a linguistic-centric sub-query, ordered:
to make matches between terms in the query and metadata elements more determinative of document relevancy than matches between terms in the query and text elements;
to make a phrase match more determinative of document relevancy than a proximity match; and
to make a proximity match more determinative of document relevancy than a Boolean AND match.

8. The method of claim 1, where document relevance is a function of a metadata element weight and further including establishing the following metadata element to metadata element weight pairs: (title, $w_1$), (description, $w_2$), (keyword, $w_3$), (subject, $w_4$), (author, $w_5$), (url, $w_6$), (H1 headline, $w_7$), (H2 headline, $w_8$), and (anchortext, $w_9$), where $w_1$ through $w_9$ are configurable to facilitate determining the document relevance before document retrieval.

9. The method of claim 8, where $w_1 > w_2 > w_3 > w_4 > w_5 > w_6 > w_7 > w_8 > w_9$.

10. The method of claim 1, where the numeric metadata link score is directly proportional to document relevance and where the numeric metadata URL depth is inversely proportional to document relevance.

11. The method of claim 1, further comprising
providing retrieved documents to a user, the documents being ordered based on relevance without performing post-retrieval relevance ranking and where duplicate documents are removed.

12. A computer implemented method, comprising:
receiving a query, the query being configured to cause a search logic to retrieve one or more documents, the documents comprising text elements and metadata elements;
creating from the query a series of sub-queries {$SQ_1, \ldots SQ_N$}, N being an integer greater than 1, the series of sub-queries including a sub-query based on one or more of, a numeric metadata link score, and a numeric metadata URL depth, where the numeric metadata link score is directly proportional to document relevance and where the numeric metadata URL depth is inversely proportional to document relevance;
the series of sub-queries being configured so that a sub-query $SQ_X$ will cause the search logic to retrieve fewer documents than a sub-query $SQ_Y$ when X<Y;
the series of sub-queries being configured so that a sub-query $SQ_A$ will cause the search logic to retrieve documents having a higher relevancy than a sub-query $SQ_B$ when A<B; and
providing, in order according to the configuration of the series of sub-queries, one or more sub-queries from the series of sub-queries to the search logic until a pre-determined number of documents are retrieved by the search logic.

13. A non-transitory computer-readable storage medium storing processor executable instructions operable to perform a method, the method comprising:
receiving a query, the query being configured to cause a search logic to retrieve one or more documents, the documents comprising text elements and metadata elements;
creating from the query a series of sub-queries {$SQ_1, \ldots SQ_N$}, N being an integer greater than 1, the series of sub-queries including one or more of, a sub-query based on one or more of, a numeric metadata link score, and a numeric metadata URL depth, where the numeric metadata link score is directly proportional to document relevance and where the numeric metadata URL depth is inversely proportional to document relevance;
the series of sub-queries being configured so that a sub-query $SQ_X$ will cause the search logic to retrieve fewer documents than a sub-query $SQ_Y$ when X<Y;
the series of sub-queries being configured so that a sub-query SQA will cause the search logic to retrieve documents having a higher relevancy than a sub-query SQB when A<B; and
providing, in order providing, in order one or more sub-queries from the series of sub-queries, one or more sub-queries from the series of sub-queries to the search logic until a pre-determined number of documents are retrieved by the search logic.

14. The non-transitory computer-readable medium of claim 13, where the series of sub-queries includes a metadata-centric sub-query and further where the metadata-centric sub-query comprises one or more of, a sub-query that matches terms in the query to one or more metadata elements on a phrase level, a sub-query that matches terms in the query to one or more metadata elements on a proximity level, and a sub-query that matches terms in the query to one or more metadata elements on a Boolean AND level.

15. The non-transitory computer-readable medium of claim 14, where the metadata elements include one or more of, a title, a description, a keyword, a subject, an author, a uniform resource locator (URL), an H1 headline, an H2 headline, and an anchor text.

16. The non-transitory computer-readable medium of claim 14, where the metadata-centric sub-query includes at least one metadata element associated with a metadata element weight, and where the document relevance is a function of a type of match between terms in the query and the metadata element.

17. The non-transitory computer-readable medium of claim 13, where the series of sub-queries includes a linguistic-centric sub-query and further where the linguistic-centric sub-query includes one or more of, a sub-query that matches terms in the query to one or more text elements on a phrase level, a sub-query that matches terms in the query to one or more text elements on a proximity level, and a sub-query that matches terms in the query to one or more text elements on a Boolean AND level.

18. The non-transitory computer-readable medium of claim 13, where the instructions include creating a sub-query by stemming terms in the query.

19. The non-transitory computer-readable medium of claim 13, where the series of sub-queries includes a metadata-centric sub-query and a linguistic-centric sub-query, ordered:
to make matches between terms in the query and metadata elements more determinative of document relevancy than matches between terms in the query and text elements;
to make a phrase match more determinative of document relevancy than a proximity match; and
to make a proximity match more determinative of document relevancy than a Boolean AND match.

20. The non-transitory computer-readable medium of claim 13, where document relevance is a function of a metadata element weight and further including establishing the following metadata element to metadata element weight pairs: (title, $w_1$), (description, $w_2$), (keyword, $w_3$), (subject, $w_4$), (author, $w_5$), (url, $w_6$), (H1 headline, $w_7$), (H2 headline, $w_8$), and (anchortext, $w_9$), where $w_1$ through $w_9$ are configurable to facilitate determining the document relevance before document retrieval.

21. The non-transitory computer-readable medium of claim 20, where $w_1 > w_2 > w_3 > w_4 > w_5 > w_6 > w_7 > w_8 > w_9$.

22. The non-transitory computer-readable medium of claim 13, comprising providing retrieved documents to a user, the documents being ordered based on relevance without performing post-retrieval relevance ranking and where duplicate documents are removed.

* * * * *

UNITED STATES PATENT AND TRADEMARK OFFICE
CERTIFICATE OF CORRECTION

| | | Page 1 of 1 |
|---|---|---|
| PATENT NO. | : 7,849,077 B2 | |
| APPLICATION NO. | : 11/481686 | |
| DATED | : December 7, 2010 | |
| INVENTOR(S) | : Ciya Liao et al. | |

It is certified that error appears in the above-identified patent and that said Letters Patent is hereby corrected as shown below:

In column 3, line 37, delete "servelet," and insert -- servlet, --, therefor.

In column 14, line 17, in claim 13, delete "SQA" and insert -- $SQ_A$ --, therefor.

In column 14, line 19, in claim 13, delete "SQB" and insert -- $SQ_B$ --, therefor.

Signed and Sealed this
Ninth Day of August, 2011

David J. Kappos
*Director of the United States Patent and Trademark Office*